(12) United States Patent
Kim et al.

(10) Patent No.: US 8,297,672 B2
(45) Date of Patent: Oct. 30, 2012

(54) HUMANOID ROBOT

(75) Inventors: Yong Jae Kim, Seoul (KR); Ja Woo Lee, Seoul (KR); Kang Min Park, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 282 days.

(21) Appl. No.: 12/411,441

(22) Filed: Mar. 26, 2009

(65) Prior Publication Data

US 2010/0011899 A1   Jan. 21, 2010

(30) Foreign Application Priority Data

Jul. 16, 2008   (KR) .................. 10-2008-0069275

(51) Int. Cl.
*B25J 15/08* (2006.01)
*B25J 17/02* (2006.01)

(52) U.S. Cl. ............ 294/106; 294/111; 901/29; 901/36

(58) Field of Classification Search .................. 294/106, 294/111, 200; 901/29, 36; 623/61, 62, 64
See application file for complete search history.

(56) References Cited

U.S. PATENT DOCUMENTS

| | | | | |
|---|---|---|---|---|
| 1,507,682 | A * | 9/1924 | Pecorella et al. ............... | 623/62 |
| 4,246,661 | A * | 1/1981 | Pinson ............................ | 623/25 |
| 4,986,723 | A * | 1/1991 | Maeda ........................... | 414/729 |
| 5,178,032 | A * | 1/1993 | Zona et al. .................. | 74/479.01 |
| 5,447,403 | A * | 9/1995 | Engler, Jr. ......................... | 414/4 |
| 6,969,385 | B2 * | 11/2005 | Moreyra ............................ | 606/1 |
| 7,101,363 | B2 * | 9/2006 | Nishizawa et al. ............... | 606/1 |
| 7,144,430 | B2 * | 12/2006 | Archer et al. .................... | 623/61 |
| 7,222,904 | B2 * | 5/2007 | Matsuda ....................... | 294/111 |
| 7,398,707 | B2 * | 7/2008 | Morley et al. .............. | 74/490.06 |
| 2005/0121929 | A1 * | 6/2005 | Greenhill et al. ............. | 294/106 |

FOREIGN PATENT DOCUMENTS

KR   20040004458   1/2004

\* cited by examiner

*Primary Examiner* — Dean Kramer
(74) *Attorney, Agent, or Firm* — Stanzione & Kim, LLP

(57) ABSTRACT

Disclosed is a humanoid robot capable of improving power transmission efficiency of a wire and movement displacement of a wrist joint by modifying the structure of the wrist joint serving as a passage for wires. The humanoid robot includes a robot hand including a power transmission device for transferring gripping force to finger members. The power transmission device includes connection members connecting an actuator to finger joints and guide members for guiding the connection members. The guide members include a first guide member coupled to a robot arm and a second guide member coupled to a hand body. The connection members are alternately wound around the first and second guide members. The gripping force is enhanced whereby a length of the connection members provided between the first and second guide members is constantly maintained even if the second guide member is shifted from the first guide member.

24 Claims, 15 Drawing Sheets

HUMANOID ROBOT

CROSS-REFERENCE TO RELATED APPLICATIONS

This application claims priority under 35 U.S.C. §119(a) from Korean Patent Application No. 10-2008-0069275 filed on Jul. 16, 2008, in the Korean Intellectual Property Office, the disclosure of which is incorporated herein in its entirety by reference.

BACKGROUND OF THE INVENTION

1. Field of the Invention

The present general inventive concept relates to a humanoid robot. More particularly, the present general inventive concept relates to a humanoid robot capable of improving power transmission efficiency and movement displacement by modifying a wrist joint of the humanoid robot.

2. Description of the Related Art

Robots are extensively used in various industrial and domestic fields. As a result, research and development concerning humanoid robots has accelerated in recent years. In order to enable a humanoid robot to perform housework in a manner done by a human hand, for example, a humanoid robot must be able to safely and rapidly grip and handle various objects of varying sizes used by human beings.

Since the size of a robot hand is limited in a humanoid robot, many motors having large capacity may not be installed for the hand of the humanoid robot. For this reason, the robot hand tends to represent relatively low gripping force as compared with the gripping force of a human hand. In addition, since there are structural limitations in the use of a robot hand, the degree of freedom of movement of the robot hand has been very low as compared with the gripping force of the human hand.

In order to increase the gripping force of a robot hand, a motor can be installed in an arm part near the forearm, apart from the robot hand, to transfer a driving force of the motor to the fingers using wires. The wires extend by passing through a wrist joint that connects the hand to the forearm part. In order to reduce friction when the wires pass through the wrist joint, the wires are supported by two pulleys.

However, if the wrist joint is moved, the two pulleys are also moved, so that the length of the wires supported by the two pulleys may be altered. If the length of the wires are changed, the fingers may not be precisely controlled by the wires. Since the movement of the wrist joint exerts an influence upon the length of the wires, the motor driving the wires must be thus controlled in relation to the movement of the wrist joint. As a result, the driving mechanism of the motor for controlling the fingers may be hindered due to the movement of the wrist joint.

To solve the above problem, there has been suggested a driving mechanism capable of preventing the length of the wire from being changed even if the wrist joint is moved. In such a driving mechanism, the wire passing through the wrist joint, which connects the robot hand to the forearm part, is inserted into a tube, so that the length of the wire can be constantly maintained even if the wrist joint is moved. The tube serves to keep the length of the wire unchanged regardless of the movement of the wrist joint. Since the length of the wire is not changed even if the wrist joint is moved, it is not necessary to control the motor driving the wire to compensate for the length of the wire.

However, one problem with the above solution is that friction may occur between the tube and the wire inserted into the tube. Such friction may cause a great loss in the driving force of the motor, and this loss may become increased as movement displacement of the wrist joint is increased. If the movement displacement of the wrist joint is increased, the tube is excessively bent so that friction between the wire and the tube is further increased. When this happens, power transmission efficiency of the motor is remarkably lowered. To solve this problem, the movement displacement of the wrist joint must be restricted.

SUMMARY OF THE INVENTION

The present general inventive concept provides a humanoid robot having a robot hand, capable of improving power transmission efficiency of a motor and ensuring movement displacement of a wrist joint by modifying the structure of the wrist joint serving as a passage for a wire.

Additional features and/or utilities of the present general inventive concept will be set forth in part in the description which follows and, in part, will be apparent from the description herein, or may be learned by practice of the general inventive concept.

An embodiment of the present general inventive concept provides a humanoid robot comprising a wrist joint connecting a robot arm to a hand body, a first actuator and a first power transmission device that drive the wrist joint to rotate the hand body relative to the robot arm, finger members comprising finger joints and knuckles, wherein the finger members are connected to the hand body, and a second actuator and a second power transmission device that drive the finger joints to rotate the finger members relative to the hand body, wherein the second power transmission device includes connection members connecting the finger joints to the second actuator, and guide members for guiding the connection members, wherein the guide members include a first guide member coupled with the robot arm and a second guide member coupled with the hand body, and wherein the connection members are alternately wound around the first and second guide members.

Lengths of the connection members provided between the first and second guide members are constantly maintained even if the second guide member is shifted from the first guide member. The robot arm includes a first contact section making contact with the hand body, the hand body includes a second contact section making contact with the first contact section, and the second contact section is configured to slide-roll on the first contact section. The first power transmission device includes a support member connecting the robot arm to the hand body and a belt for rotating the support member.

The support member may include a first rotating section rotatably installed in the robot arm and a second rotating section rotatably installed in the hand body. The first guide member is rotatably coupled with the first rotating section and the second guide member is rotatably coupled with the second rotating section.

The first contact section has a circular shape having a first radius, a second contact section has a circular shape having a second radius, wherein the first radius has the same length as the second radius.

A ratio of the first radius to the second radius can be identical to a radius ratio of the first guide member to the second guide member when the first radius is different from the second radius.

The first contact section has a planar shape, and the second contact section has a circular shape having a second radius about the second rotating section. A radius of the second guide member is the same length as the second radius of the second contact section.

The first power transmission device includes a first rotating section rotatably inserted into the hand body and a belt for moving the first rotating section. The humanoid robot may further include a slot for guiding the first rotating section and a belt support member having a reel that supports the belt to allow the belt to guide the first support member along the slot.

The hand body includes a pivot shaft rotatably coupled to the robot arm. The first power transmission device includes the pivot shaft and a belt for rotating the pivot shaft. A first reel is fitted around the pivot shaft and a second reel is coupled with the first actuator.

The robot arm includes a first support member, to which the first guide member is rotatably coupled, and the hand body includes a second support member, to which the second guide member is rotatably coupled. The second support member rotates together with the pivot shaft.

Portions of the connection members aligned between the first and second guide members are positioned in line with the pivot shaft rotatably coupled to the robot arm.

Embodiments of the present general inventive concept provide a humanoid robot comprising a robot arm, a hand body connected to the robot arm through a wrist joint, finger members connected to the hand body through finger joints, a first actuator and a first power transmission device that drive the wrist joint to rotate the hand body relative to the robot arm, and a second actuator and a second power transmission device that drive the finger joints to rotate the finger members relative to the hand body, wherein the first power transmission device driving the wrist joint operates independently from the second power transmission device driving the finger joints.

The second power transmission device includes connection members connecting the second actuator to the finger joints and guide members for guiding the connection members, wherein friction between the connection members and the guide members are constantly maintained when the wrist joint is driven by the first actuator and the first power transmission device. The guide members include a first guide member coupled to the robot arm and a second guide member coupled to the hand body, and the connection members are alternately wound around the first and second guide members. Lengths of the connection members provided between the first and second guide members are constantly maintained even if the second guide member is shifted from the first guide member. The connection members include wires and the guide members include pulleys.

Embodiments of the present general inventive concept provide a humanoid robot including a robot arm, a hand body connected to the robot arm through a wrist joint, finger members comprising finger joints and knuckles, wherein the finger members are connected to the hand body, a first actuator and a first power transmission device that drive the wrist joint to rotate the hand body relative to the robot arm; and a second actuator and a second power transmission device that drive the finger joints to rotate the finger members relative to the hand body, wherein the second power transmission device includes connection members connecting the second actuator to the finger joints and guide members for guiding the connection members, and wherein the length of the connection members, which connects the actuator to the finger members, can be constantly maintained, so that the finger joints can move with sufficient movement displacement.

The humanoid robot may also include a support member that connects the hand body to the robot arm, wherein the support member comprises a first rotating section inserted into the robot arm, a second rotating section inserted into the hand body; and a leg section connecting the first rotating section to the second rotation section.

The humanoid robot may also include a first reel installed at the support member, a second reel installed adjacent the first actuator; and a belt that is wound around the first and second reels, wherein a driving force of the first actuator is transferred to the support member through the belt.

According to the humanoid robot of the present general inventive concept, connection members are alternately wound around the first and second guide members, so that driving force of the actuator can be efficiently transferred to the finger joints.

The length of the connection members, which connects the actuator to the finger members, can be constantly maintained, so that the finger joint can move with sufficient moving angle (or movement displacement).

Further, the humanoid robot according to the present general inventive concept can be used as medical equipment, such as a surgery robot and an endoscope, a probe robot, and a working robot in dangerous fields to transfer power to an end effecter.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
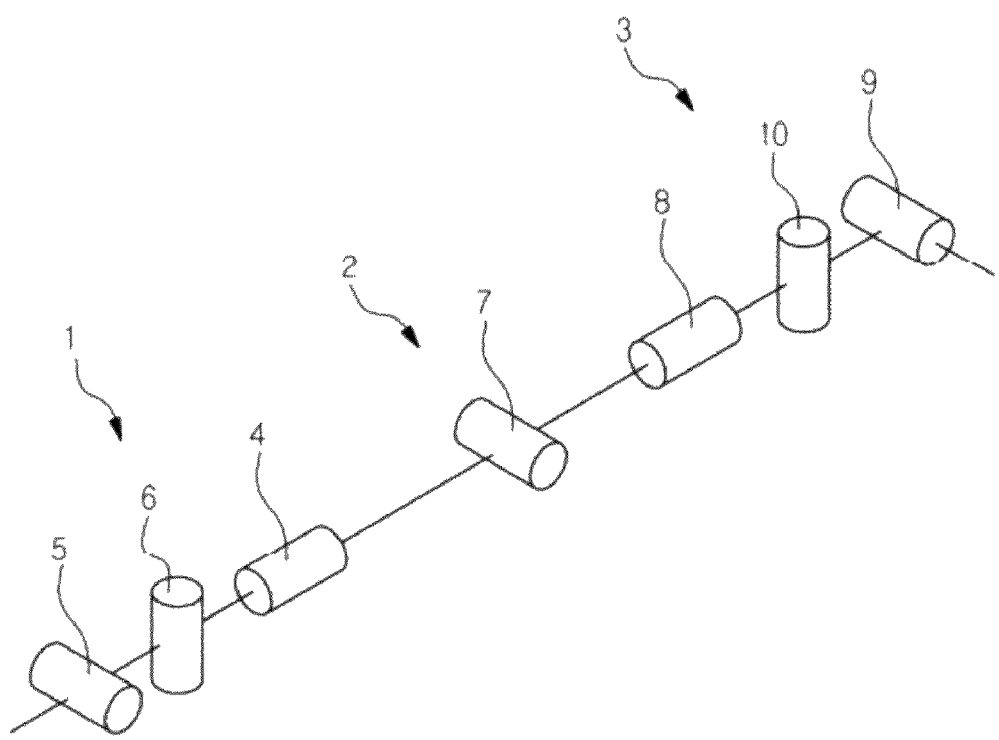
FIG. 1 is a schematic perspective view showing a joint structure of a humanoid robot according to the present general inventive concept.

Reference will now be made in detail to the embodiments of the present general inventive concept, examples of which are illustrated in the accompanying drawings, wherein like reference numerals refer to the like elements throughout. The embodiments are described below to explain the present general inventive concept by referring to the figures.

Figure 2:
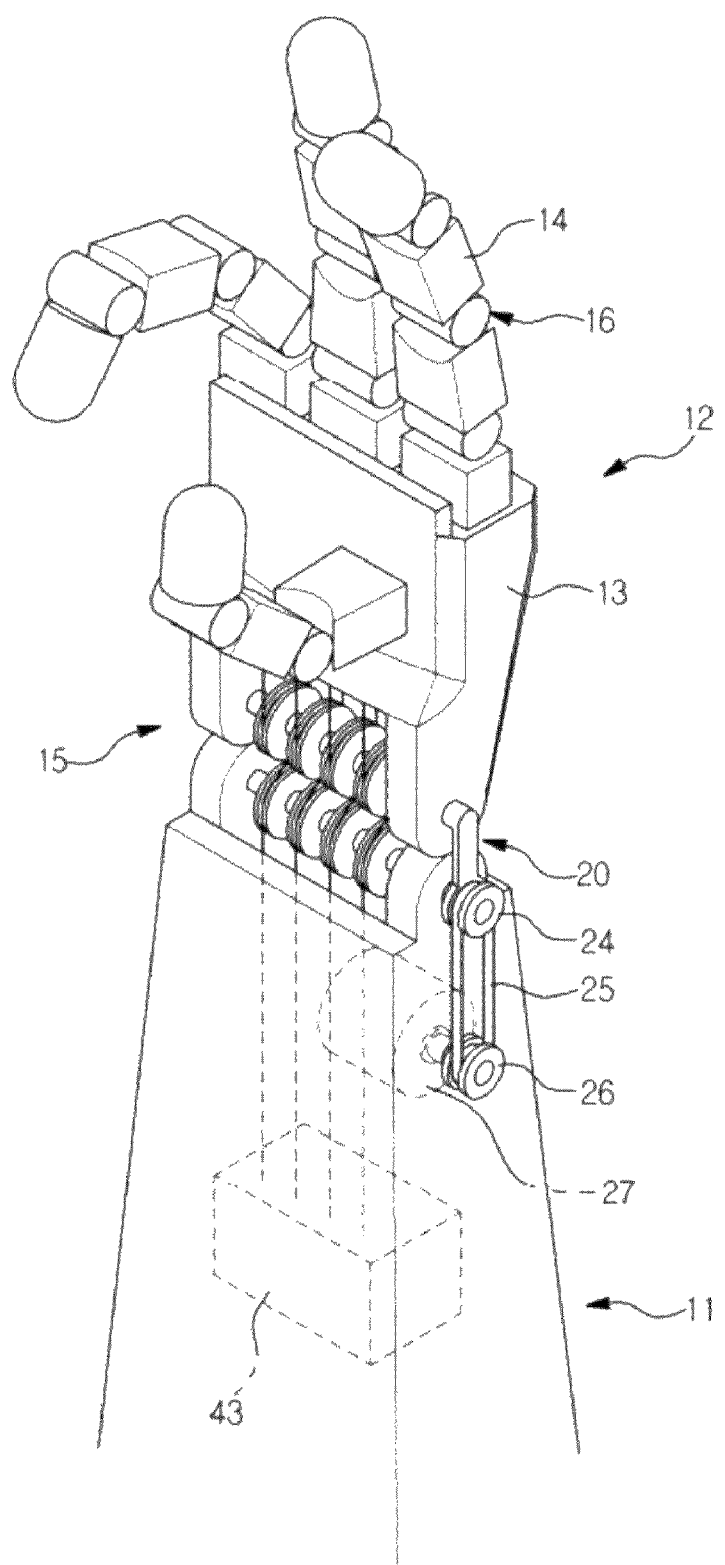
FIG. 2 is a perspective view showing a robot hand and a robot arm according to the present general inventive concept.

As shown in FIGS. 1 and 2, a robot arm of the humanoid robot according to an embodiment of the present general inventive concept includes a shoulder joint 1, an elbow joint 2 and a wrist joint 3. The shoulder joint 1 includes a first joint 4 rotating about an X axis, a second joint 5 rotating about a Y axis, and a third join 6 rotating about a Z axis. The shoulder joint 1 having the first to third joints 4 to 6 having three degrees of freedom, or the 3-DOF.

The elbow joint 2 includes a fourth joint 7 rotating about the Y axis. The fourth joint 7 allows the robot arm to be folded. The elbow joint 2 having the fourth joint 7 has one degree of freedom, or 1-DOF.

The wrist joint 3 includes a fifth joint 8 rotating about the X axis, a sixth joint 9 rotating about the Y axis, and a seventh joint 10 rotating about the Z axis. The wrist joint 3 having the fifth to seventh joints 8 to 10 has the 3-DOF. In particular, the sixth joint 9 rotating about the Y axis and the seventh joint 10 rotating about the Z axis allow a robot hand 12 to be bent relative to a robot arm 11

Figure 3:
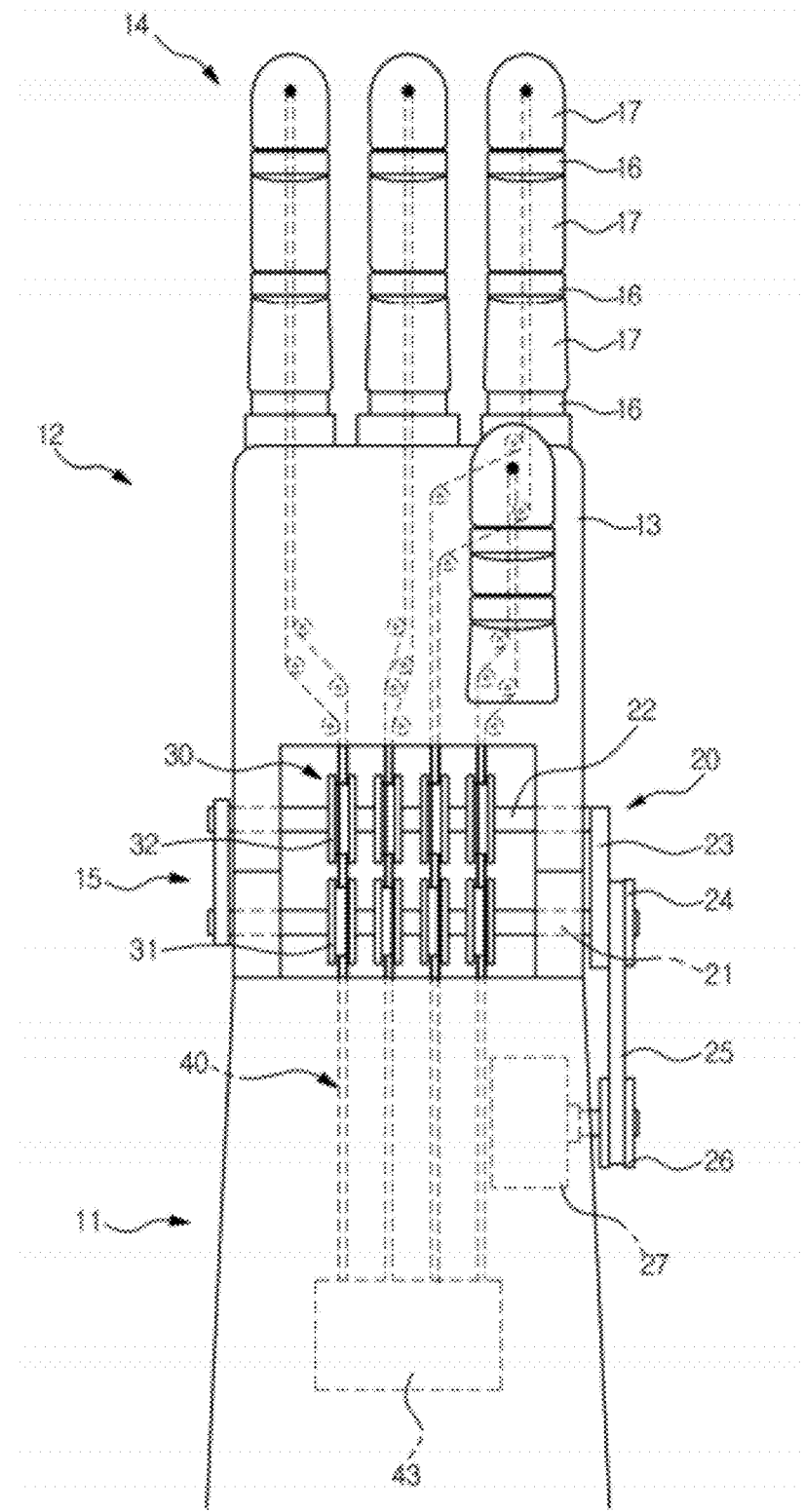
FIG. 3 is a front view showing a robot hand and a robot arm according to the present general inventive concept.

As shown in FIGS. 2 and 3, the humanoid robot according to the present general inventive concept includes the robot arm 11 and the robot hand 12 connected to the robot arm 11 through a wrist joint 15.

A hand body 13 is connected to the robot arm 11 by a support member 20 such that the hand body 13 can rotate relative to the robot arm 11. The support member 20 includes a first rotating section 21 inserted into the robot arm 11, a second rotating section 22 inserted into the hand body 13, and a leg section 23 connecting the first rotating section 21 to the second rotating section 22. In addition, a first reel 24 is installed at the support member 20 and a second reel 26 is installed adjacent a first actuator 27 so that driving force of the first actuator 27 can be transferred to the support member 20 through a belt 25 that is wound around the first and second reels 24 and 26. Since the first reel 24 that is installed at the support member 20 is positioned on the first rotating section 21, the support member 20 rotates about the first rotating section 21. The support member 20 and the belt 25 constitute a first power transmission device to transfer a driving force of the first actuator 27 to the wrist joint 15.

The robot hand 12 includes a hand body 13 and finger members 14 connected to the hand body 13. The finger members 14 include a plurality of finger members and a thumb member, collectively referred to as finger members. Each finger member 14 includes a plurality of knuckles 17 wherein finger joints 16 are provided between the knuckles 17.

In operation, if the knuckles 17 are rotated by the finger joints 16, the finger members 14 can grip articles. The finger members 14 must reliably grip the articles. If the finger members 14 drop the articles due to the lack of gripping force, accident may occur. In order to increase the gripping force of the finger members 14, an actuator having a large capacity can be installed to provide a great driving force to the finger members 14. However, if the driving force of the actuator is increased, the size of the actuator is enlarged so that such an actuator is not suitable for the robot hand 12.

For this reason, as shown in FIG. 2, a second actuator 43 is installed in the robot arm 11 and connection members 40 are provided to transfer driving force of the second actuator 43 to the finger joints 16. The connection members 40 connect the second actuator 43 to the finger members 14. The connection members 40 include wires and the number of connection members 40 corresponds to the number of finger members 14.

In the present embodiment, the finger joints 16 driven by the second actuator 43 can be operated independently from the wrist joint 15 that is driven by the first actuator 27. In particular, when the robot hand 12 is folded due to the driving of the wrist joint 15 by the first actuator 27, the length of the connection members 40, which connects the finger members 14 to the second actuator 43, must be constantly maintained.

Guide members 30 are provided in the wrist joint 15 to guide the connection members 40. The guide members 30 include first guide members 31 rotatably installed on the first rotating section 21 and second guide members 32 rotatably installed on the second rotating section 22. The number of first and second guide members 31 and 32 correspond to the number of finger members 14. The first and second guide members 31 and 32 may include pulleys.

Figure 4:
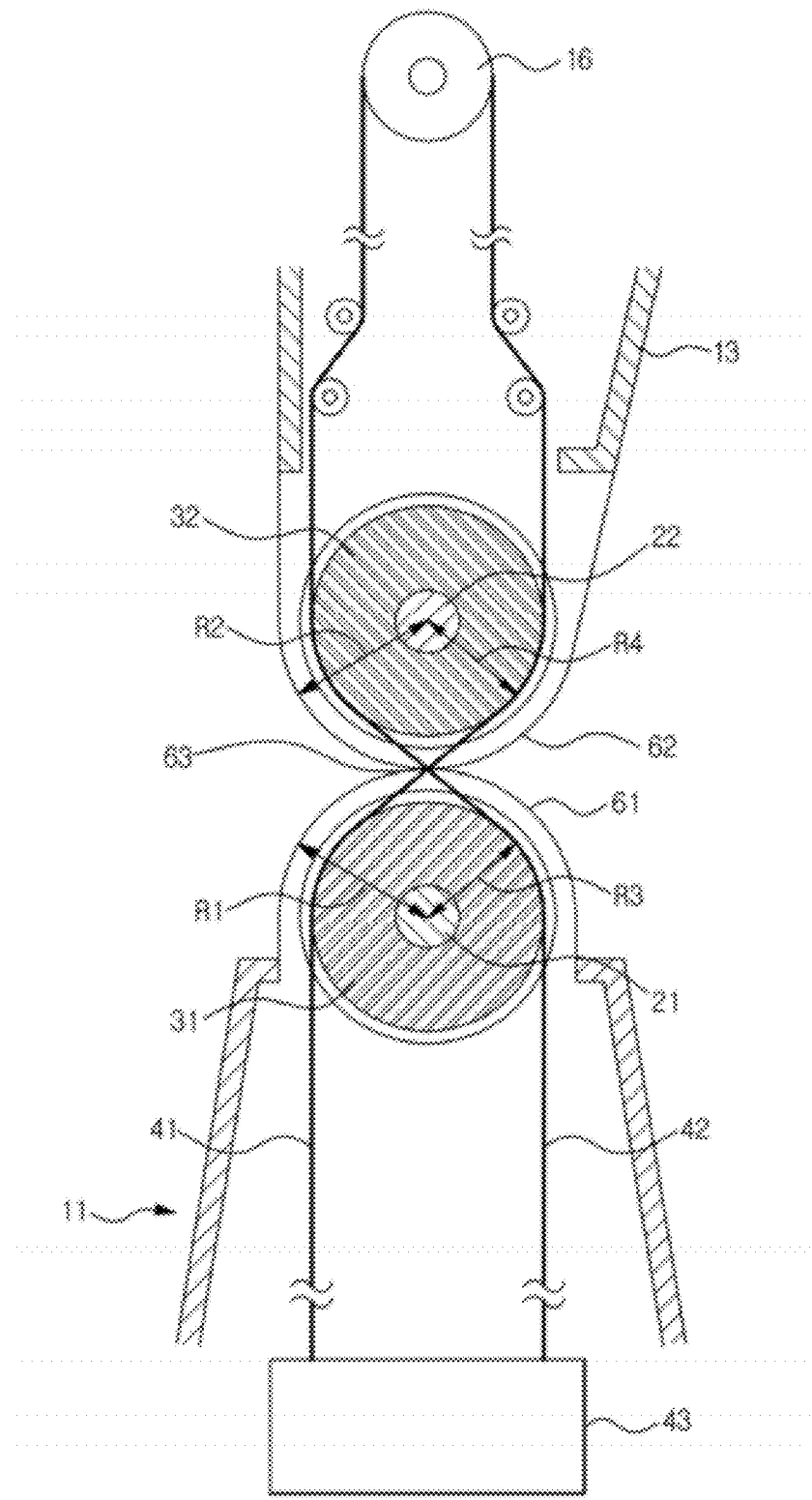
FIG. 4 is a side sectional view showing a wrist joint of a humanoid robot according to the present general inventive concept.

As shown in FIG. 4, the robot arm 11 and the hand body 13 of the humanoid robot according to the present embodiment are adjacent to each other. The robot arm 11 includes a first contact section 61, and the hand body 13 includes a second contact section 62. The first contact section 61 makes a rolling-contact with the second contact section 62. The first contact section 61 has a first radius R1 about the first rotating section 21, and the second contact section 62 has a second radius R2 about the second rotating section 22.

A radius R3 of the first guide member 31 and a radius R4 of the second guide member 32 may vary depending on the first radius R1 of the first contact section 61 and the second radius R2 of the second contact section 62. That is, if the first radius R1 of the first contact section 61 has the same length as the second radius R2 of the second contact section 62, the radius R3 of the first guide member 31 has the same length as the radius R4 of the second guide member 32. In contrast, if the first radius R1 of the first contact section 61 is different from the second radius R2 of the second contact section 62, then the ratio of the first radius R1 to the second radius R2 (that is, R1/R2) will be equal to the ratio of the radius R3 of the first guide member 31 to the radius R4 of the second guide member 32 (that is, R3/R4)

A second power transmission device includes the guide members 30 and the connection members 40 that transfer a driving force of the second actuator 43 to the finger joints 16. The connection members 40 may include first connection members 41 that are used to fold the finger members 14 and second connection members 42 that are used to unfold the finger members 14. The connection members 40 are alternately wound around the first and second guide members 31 and 32. That is, the first connection members 41 are alternately wound around a left portion of the first guide member 31 and a right portion of the second guide member 32. In contrast, the second connection members 42 are alternately wound around a right portion of the first guide member 31 and a left portion of the second guide member 32. This configuration enables the length of the first and second connection members 41 and 42, which connect the finger members 14 to the second actuator 43, can be constantly maintained even if the robot hand 12 is folded due to the driving of the wrist joint 15. Since the first and second connection members 41 and 42 have the same structure, the following description will be made with reference to the first connection members 41.

Figure 5:
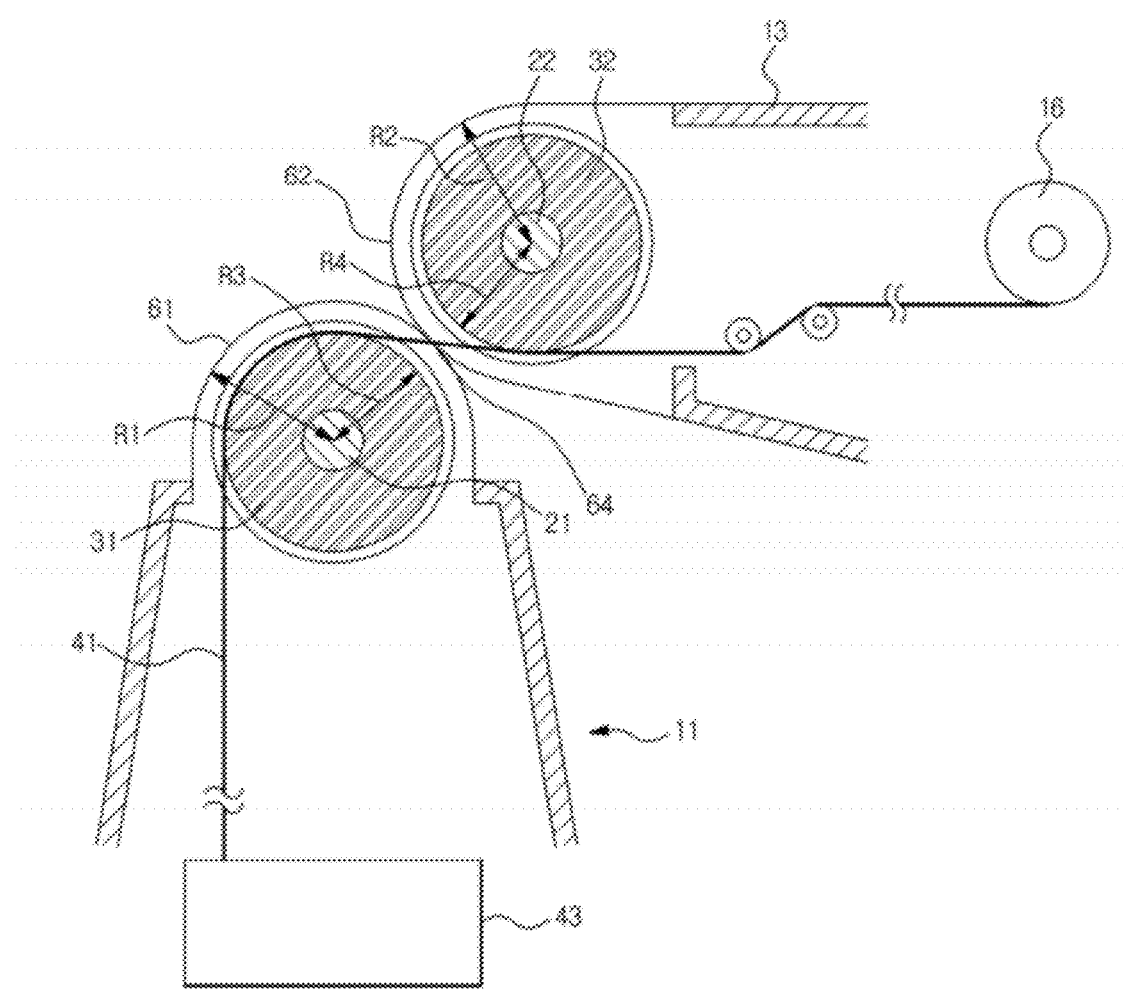
FIG. 5 is a side sectional view showing a hand body, which is bent to the right, according to the present general inventive concept.

FIG. 4 shows the hand body 13 before the hand body 13 is bent relative to the robot arm 11, and FIG. 5 shows the hand body 13 that is bent to the right relative to the robot arm 11 at an angle of 90 degrees. In FIG. 4, a contact point between the first and second contact sections 61 and 62 will be referred to as a first contact point 63. In FIG. 5, a contact point between the first and second contact sections 61 and 62 will be referred to as a second contact point 64. When the support member 20 (see, FIGS. 2 and 3) rotates about the first rotating section 21, the hand body 13 rotates relative to the robot arm 11. In this case, the first contact section 61 rolls on the second contact section 62 while the contact point between the first and second contact sections 61 and 62 is being shifted from the first contact point 63 of FIG. 4 to the second contact point 64 of FIG. 5. Thus, the length of the first connection member 41 extending from first guide members 31 to second guide members 32 may not deviate from the distance between the first and second guide members 31 and 32. Therefore, even if the hand body 13 is bent relative to the robot arm 11 due to the driving of the wrist joint 15, the length of the first connection member 41 that connects the finger members 14 to the second actuator 43 can be constantly maintained.

Figure 6:
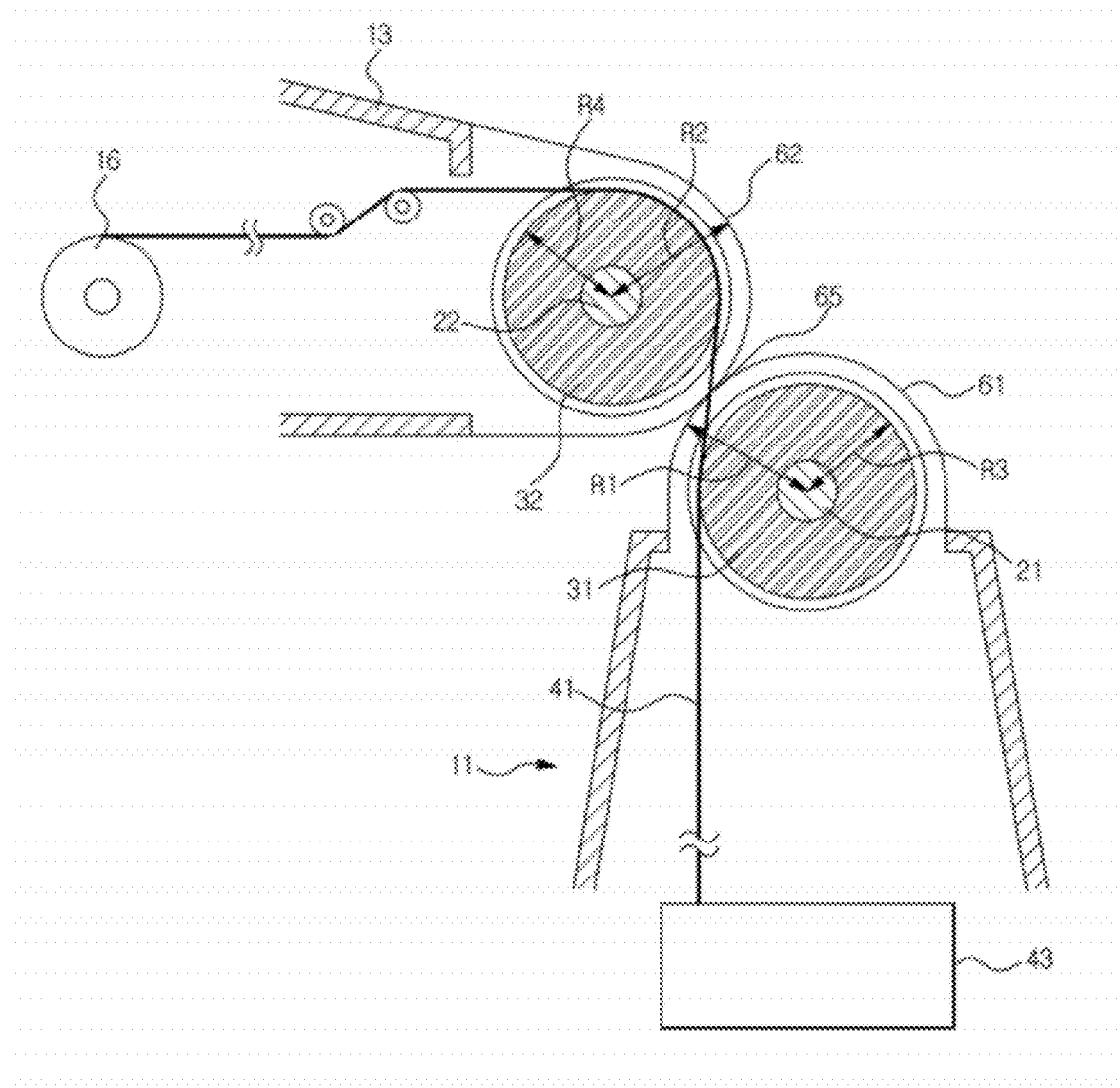
FIG. 6 is a side sectional view showing a hand body, which is bent to the left, according to the present general inventive concept.

FIG. 6 is a side sectional view showing a hand body, which is bent to the left, according to the present invention, FIG. 6 shows the hand body 13 that is bent to the left relative to the robot arm 11 at an angle of 90 degrees. In FIG. 6, a contact point between the first and second contact sections 61 and 62 will be referred to as a third contact point 65. In this configuration, the first contact section 61 rolls on the second contact section 62 while the contact point between the first and second contact sections 61 and 62 is being shifted from the first contact point 63 of FIG. 4 to the third contact point 65 of FIG. 6. At this time, the length of the first connection member 41 between the first and second guide members 31 and 32 may not deviate from the distance between the first and second guide members 31 and 32. Therefore, as mentioned above, the length of the first connection member 41 that connects the finger members 14 to the second actuator 43 can be constantly maintained even if the hand body 13 is bent relative to the robot arm 11 due to the driving of the wrist joint 15. In this way, the movement of the wrist joint does not exert an influence upon the length of the wires. Therefore, the finger members are more precisely controlled and the gripping force of the robot hand is improved.

Referring to FIGS. 4 and 6, the second actuator 43 and the second power transmission device can operate the finger members 14 independently from the first actuator 27 and the first power transmission device. In addition, since the length of the first connection member 41 wound around the first and second guide members 31 and 32 can be constantly maintained, friction between the guide members 30 and the connection members 40 can be constantly maintained. That is, a power transmission efficiency of the second power transmission device may not be lowered even if the hand body 13 is bent relative to the robot arm 11.

Figure 7:
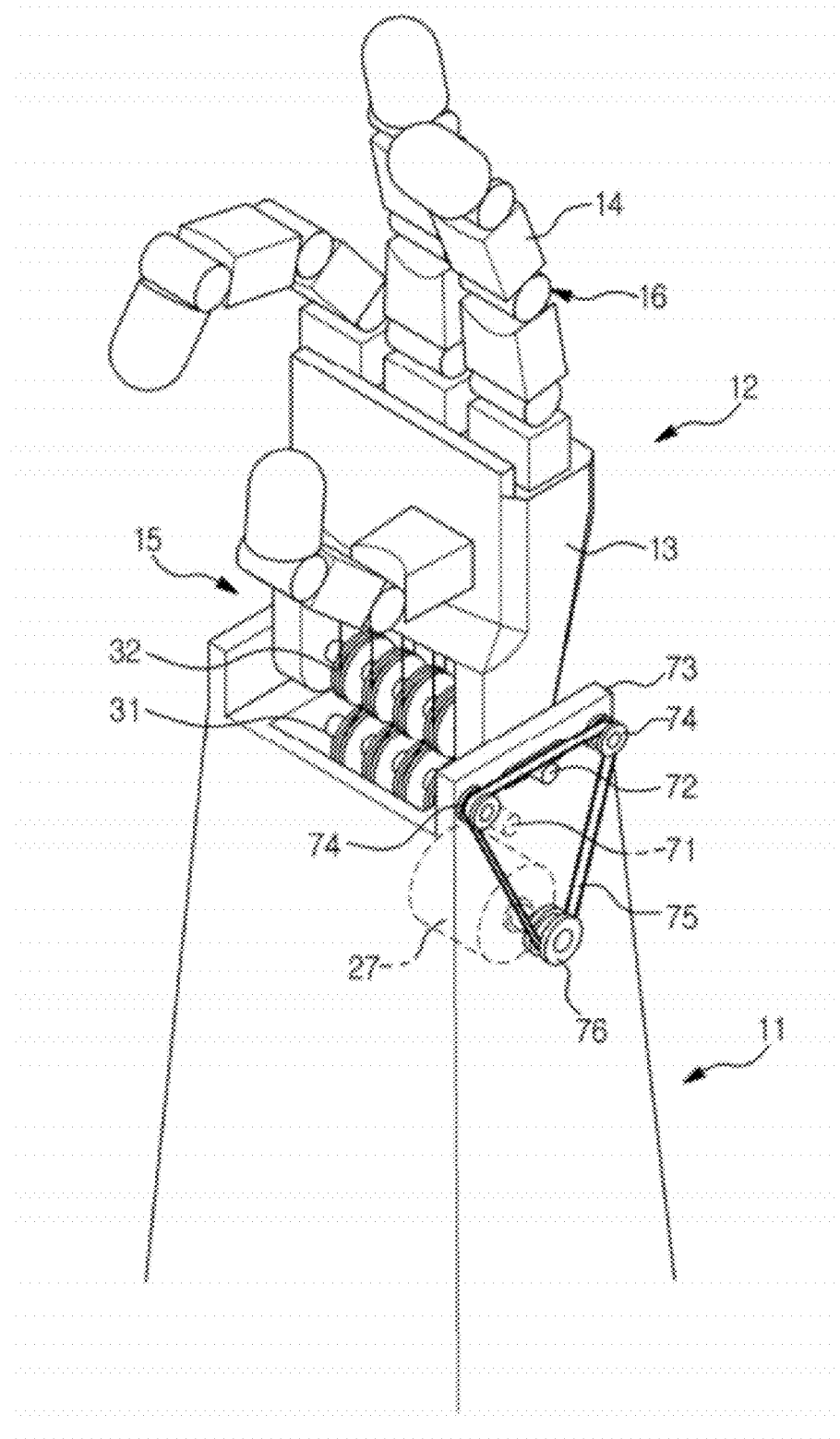
FIG. 7 is a perspective view showing a robot hand and a robot arm according to a second embodiment of the present general inventive concept.
Figure 8:
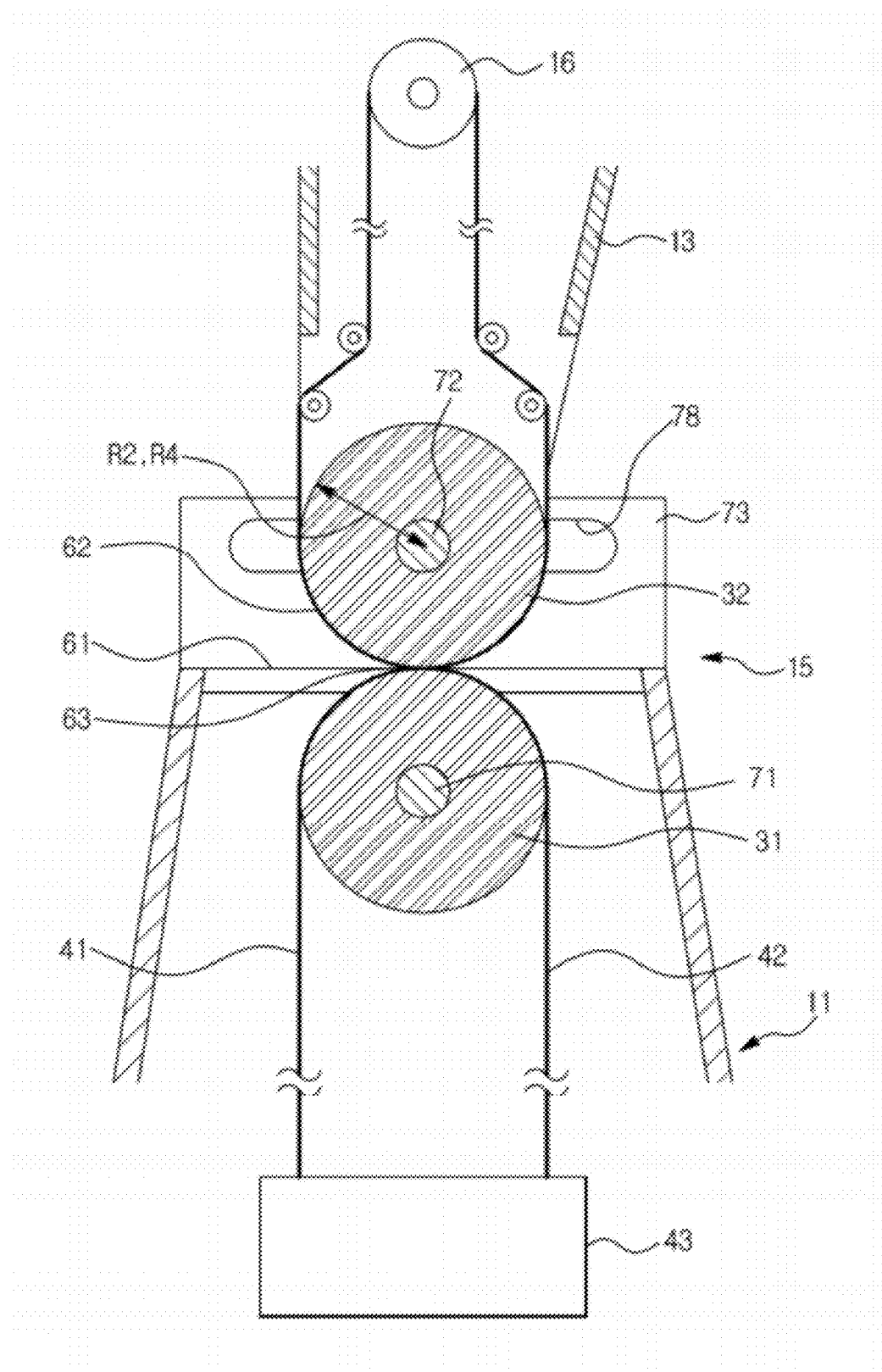
FIG. 8 is a side sectional view showing a robot hand and a robot arm according to a second embodiment of the present general inventive concept.

FIG. 7 is a perspective view showing the robot hand and the robot arm according to the second embodiment of the present invention, and FIG. 8 is a side sectional view showing the robot hand and the robot arm according to a second embodiment of the present invention.

As shown in FIGS. 7 and 8, the robot hand 12 of the humanoid robot includes a first rotating section 71 rotatably installed in the robot arm 11 and a second rotating section 72 rotatably installed in the hand body 13. In addition, the first guide member 31 is rotatably installed around the first rotating section 71 and the second guide member 32 is rotatably installed around the second rotating section 72.

A belt support member 73 is provided in the robot arm 11. The belt support member 73 has reels 74 which are positioned opposite to each other on either side of the second rotating section 72. The first actuator 27 also has a reel 76. A belt 75 is coupled with the second rotating section 72, so that when the first actuator 27 is driven, the second rotating section 72 is moved together with the belt 75. The second rotating section 72, the belt 75 and the belt support member 73 constitute the first power transmission device.

FIG. 8 shows the robot arm 11 and the hand body 13 are adjacent to each other. The robot arm 11 includes the first contact section 61, and the hand body 13 includes the second contact section 62. The first contact section 61 makes rolling-contact with the second contact section 62. If the second rotating section 71 moves together with the belt 75, the second contact section 62 rolls on the first contact section 61. The second contact section 62 has a second radius R2 about the second rotating section 72. The first contact section 61 has a planar shape.

In FIG. 8 the first guide member 31 is rotatably installed around the first rotating section 71 and the second guide member 32 is rotatably installed around the second rotating section 72. The radius R3 of the second guide member 32 is the same length as the second radius R2 of the second contact section 62.

The second power transmission device includes the guide member 30 and the connection member 40. The connection member 40 may include a first connection member 41 used to fold the finger members 14 and a second connection member 42 used to unfold the finger members 14. The first connection member is alternately wound around the first and second guide members 31 and 32. That is, the first connection member 41 is alternately wound around a left portion of the first guide member 31 and a right portion of the second guide member 32. In contrast, the second connection member 42 is alternately wound around a right portion of the first guide member 31 and a left portion of the second guide member 32. The length of the first and second connection members 41 and 42, which connect the finger members 14 to the second actuator 43, can be constantly maintained even if the robot hand 12 is folded due to the driving of the wrist joint 15. Since the first and second connection members 41 and 42 have the same structure, the following description will be made with reference to the first connection member 41.

Figure 9:
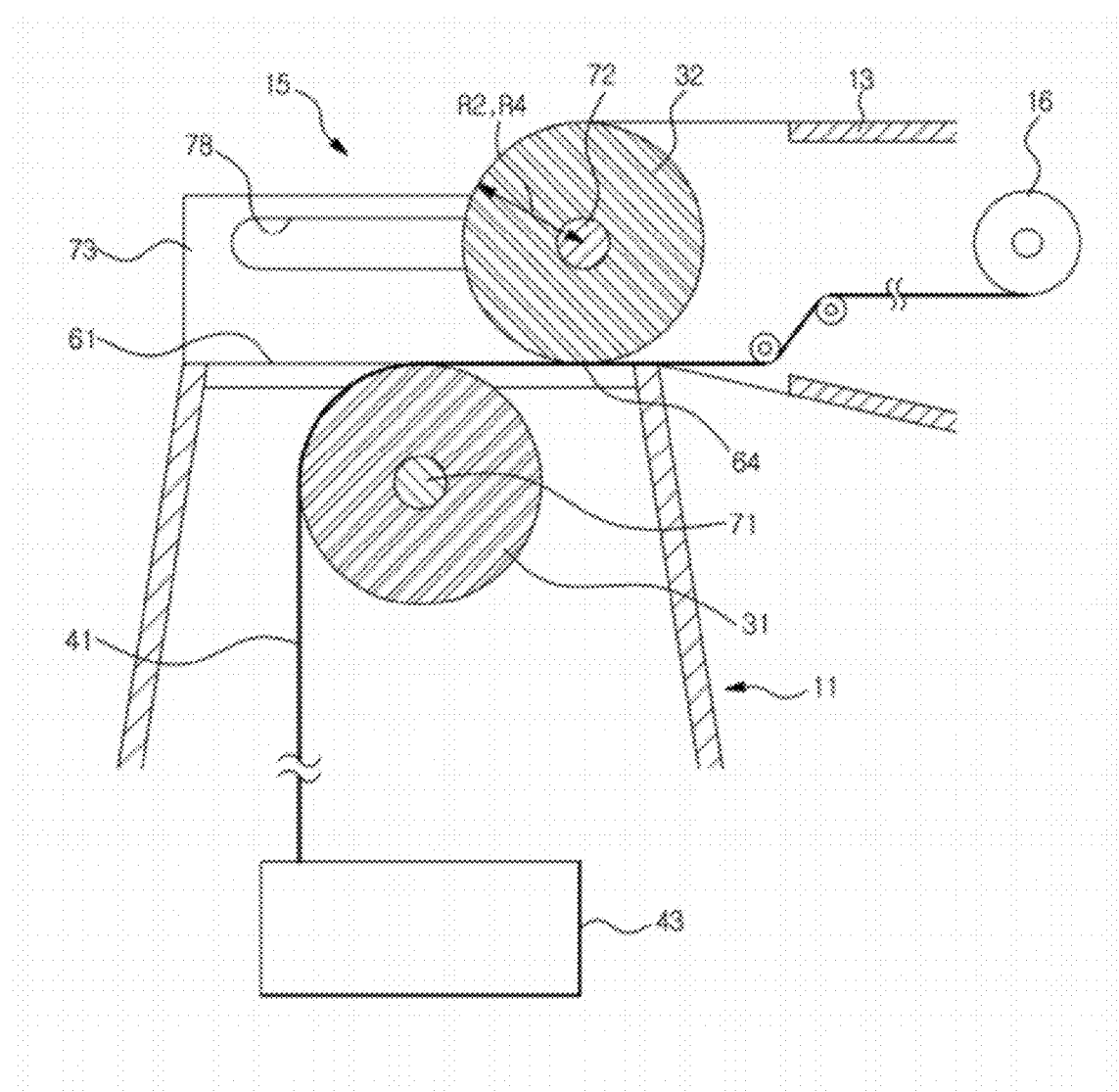
FIG. 9 is a side sectional view showing a hand body, which is bent to the right, according to the present general inventive concept.

FIG. 8 shows the hand body 13 before the hand body 13 is bent relative to the robot arm 11, and FIG. 9 shows the hand body 13 that is bent to the right relative to the robot arm 11 at an angle of 90 degrees. In FIG. 8, a contact point between the first and second contact sections 61 and 62 will be referred to as a first contact point 63. In FIG. 9, a contact point between the first and second contact sections 61 and 62 will be referred to as a second contact point 64. When the belt 75 (see, FIG. 7) moves together with the second rotating section 72, the hand body 13 rotates relative to the robot arm 11. In this case, the first contact section 61 rolls on the second contact section 62 while the contact point between the first and second contact sections 61 and 62 is being shifted from the first contact point 63 of FIG. 8 to the second contact point 64 of FIG. 9. Thus, the length of the first connection member 41 between the first and second guide members 31 and 32 can be constantly maintained. Therefore, even if the hand body 13 is bent relative to the robot arm 11 due to the driving of the wrist joint 15, the length of the first connection member 41 that connects the finger members 14 to the second actuator 43 can be constantly maintained. In this way, the movement of the wrist joint does not exert an influence upon the length of the wires. Therefore, the finger members are more precisely controlled and the gripping force of the robot hand is improved.

Figure 10:
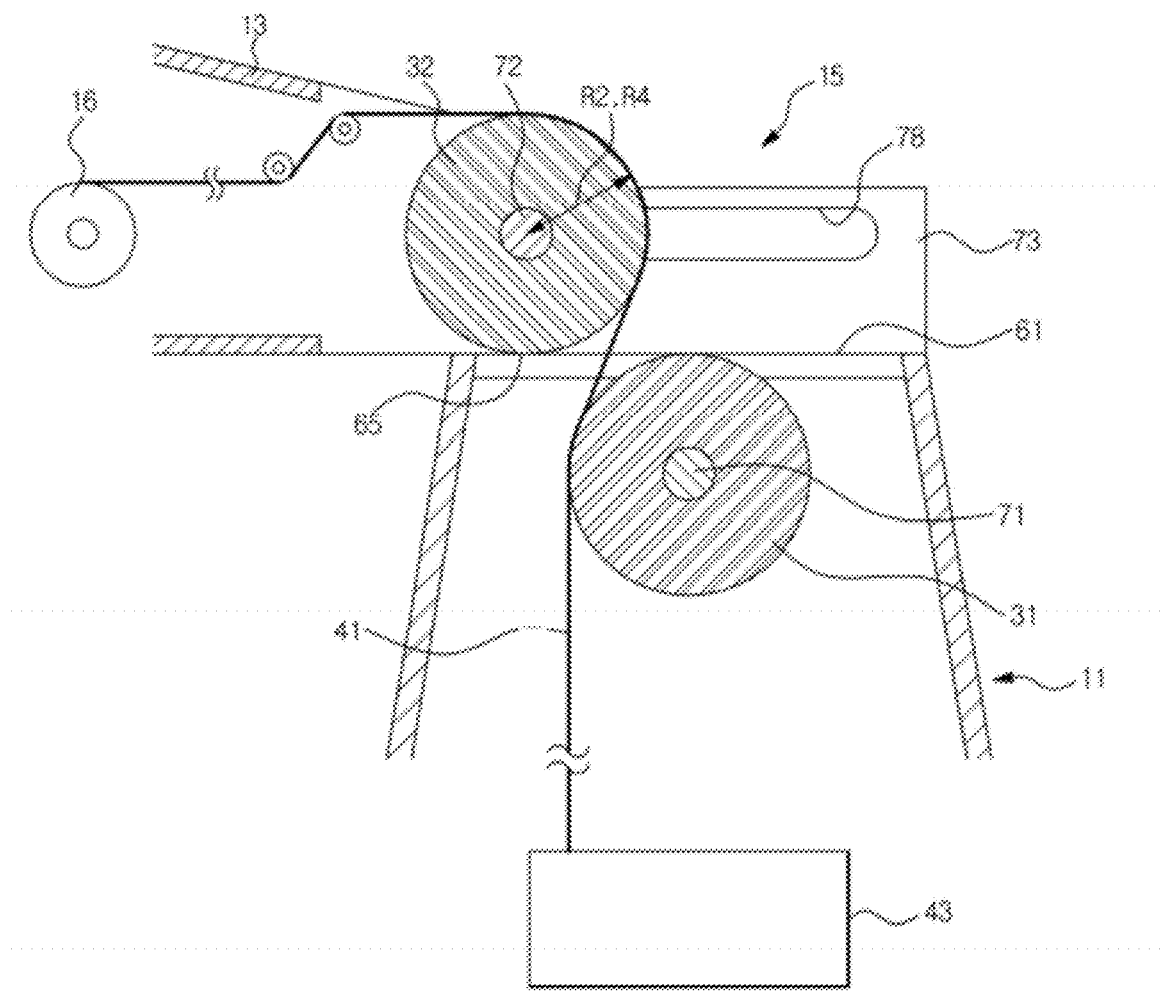
FIG. 10 is a side sectional view showing a hand body, which is bent to the left, according to the present general inventive concept.

FIG. 10 shows the hand body 13 that is bent to the left relative to the robot arm 11 at an angle of 90 degrees. In FIG. 10, a contact point between the first and second contact sections 61 and 62 will be referred to as a third contact point 65. The first contact section 61 slides on the second contact section 62 while the contact point between the first and second contact sections 61 and 62 is being shifted from the first contact point 63 of FIG. 8 to the third contact point 65 of FIG. 10. As a result, the length of the first connection member 41 between the first and second guide members 31 and 32 can be constantly maintained.

Figure 11:
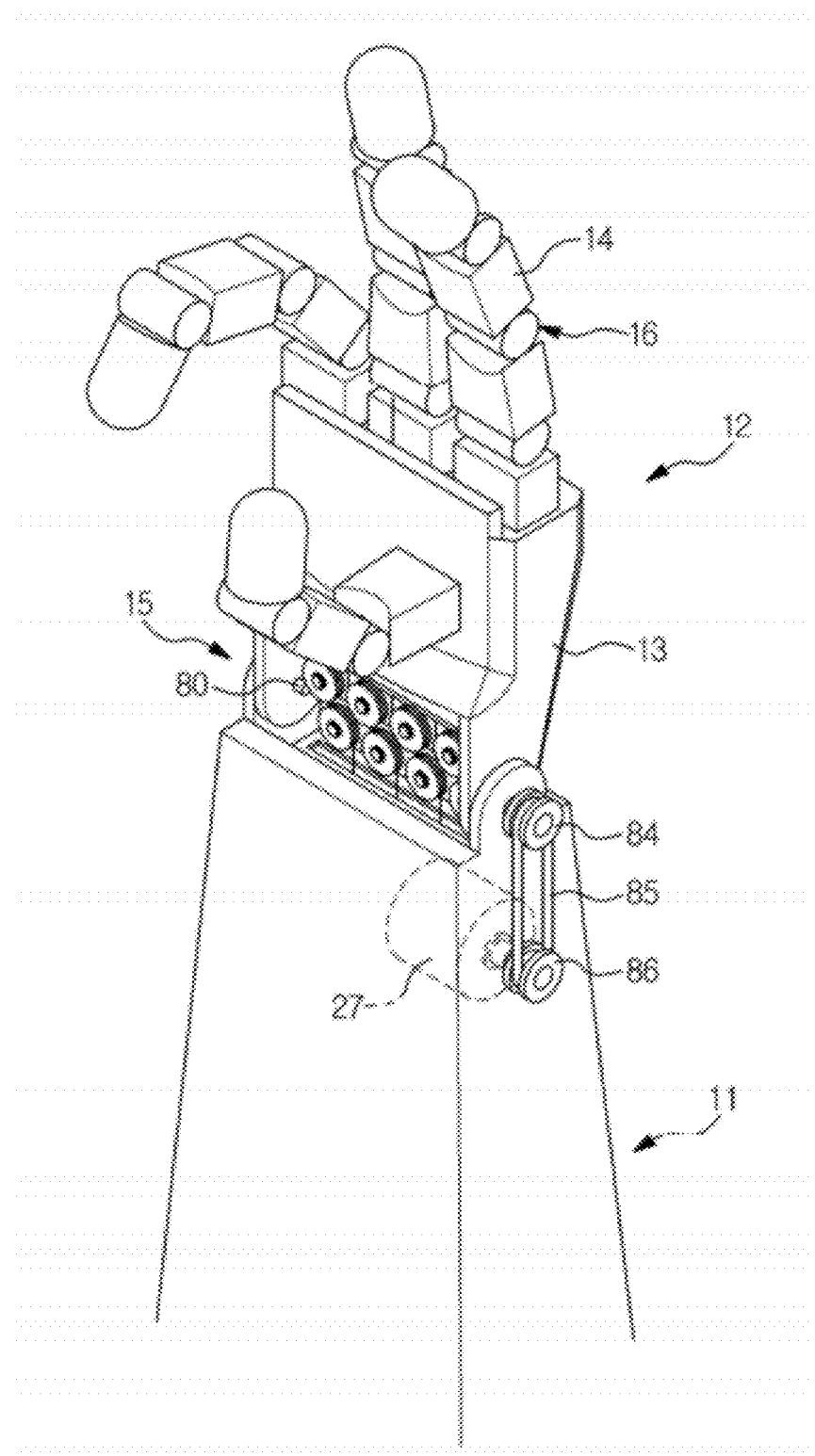
FIG. 11 is a perspective view showing a robot hand and a robot arm according to a third embodiment of the present general inventive concept.
Figure 12:
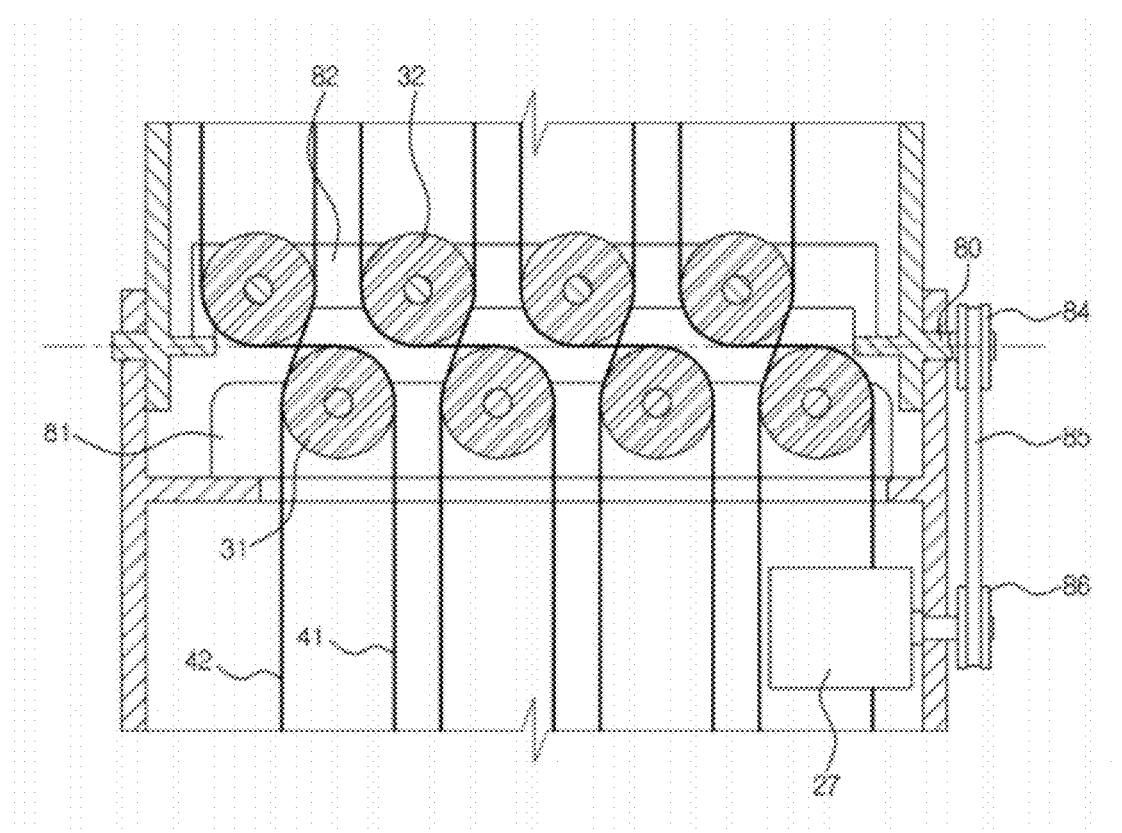
FIG. 12 is a front view showing a wrist joint according to a third embodiment of the present general inventive concept.
Figure 13:
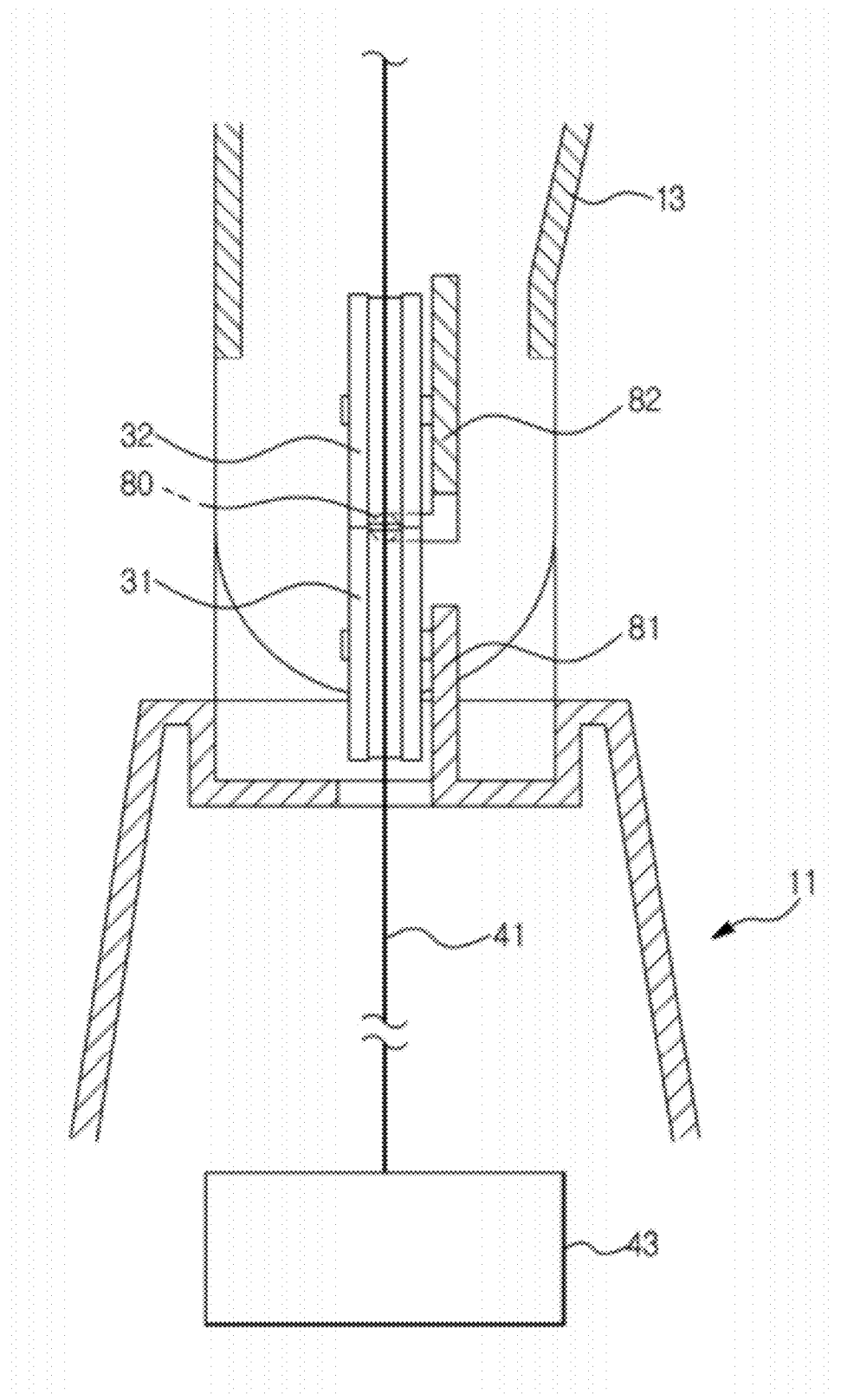
FIG. 13 is a side sectional view showing a wrist joint according to a third embodiment of the present general inventive concept.

FIG. 11 is a perspective view showing the robot hand and the robot arm according to the third embodiment of the present invention, FIG. 12 is a front view showing the wrist joint according to the third embodiment of the present invention, and FIG. 13 is a side sectional view showing the wrist joint according to the third embodiment of the present invention.

As shown in FIGS. 11 to 13, the robot hand 12 of the humanoid robot according to another embodiment of the present general inventive concept includes a pivot shaft 80 rotatably coupled to the robot arm 11. A first reel 84 is fitted around the pivot shaft 80 and a second reel 86 is coupled with the first actuator 27. The first actuator 27 rotates the pivot shaft 80 using the belt 85. The pivot shaft 80 and the belt 85 constitute the first power transmission device.

A first support member 81, to which the first guide member 31 is rotatably coupled as shown in FIGS. 12 and 13, is installed in the robot arm 11, and a second support member 82, to which the second guide member 32 is rotatably coupled, is installed in the hand body 13. The second support member 82 is connected to the pivot shaft 80, so that the second support member 82 rotates together with the pivot shaft 80. The number of first and second guide members 31 corresponds to the number of second guide members 32 and corresponds to the number of finger members 14.

The connection members 40 are alternately wound around the first and second guide members 31 and 32 to transfer the driving force of the second actuator 43 to the finger members 14. The connection members 40 include a first connection member 41 used to fold the finger members 14 and a second connection member 42 used to unfold the finger members 14. For instance, the first connection member 41 is wound around the left portion of the second guide member 32 and then wound around the right portion of the first guide member 31.

According to this embodiment, a portion of the connection members 40 aligned between the first and second guide members 31 and 32 is positioned on the same line with the pivot shaft 80. In this case, the length of the connection members 40 aligned between the first and second guide members 31 and 32 can be constantly maintained even if the hand body 13 is bent relative to the robot arm 11.

Figure 14:
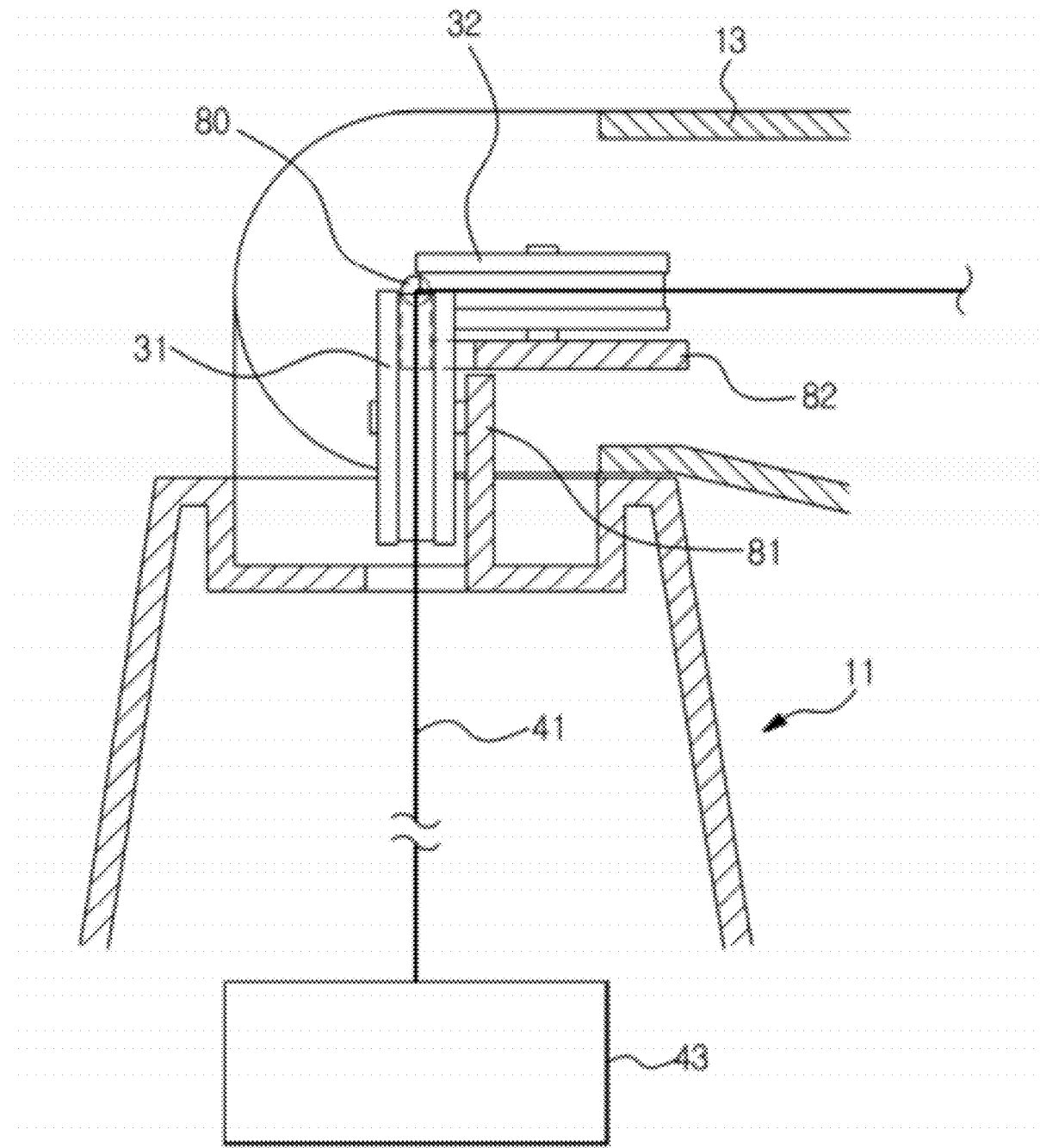
FIG. 14 is a side sectional view showing a hand body, which is bent to the right relative to a robot arm, according to the present general inventive concept.
Figure 15:
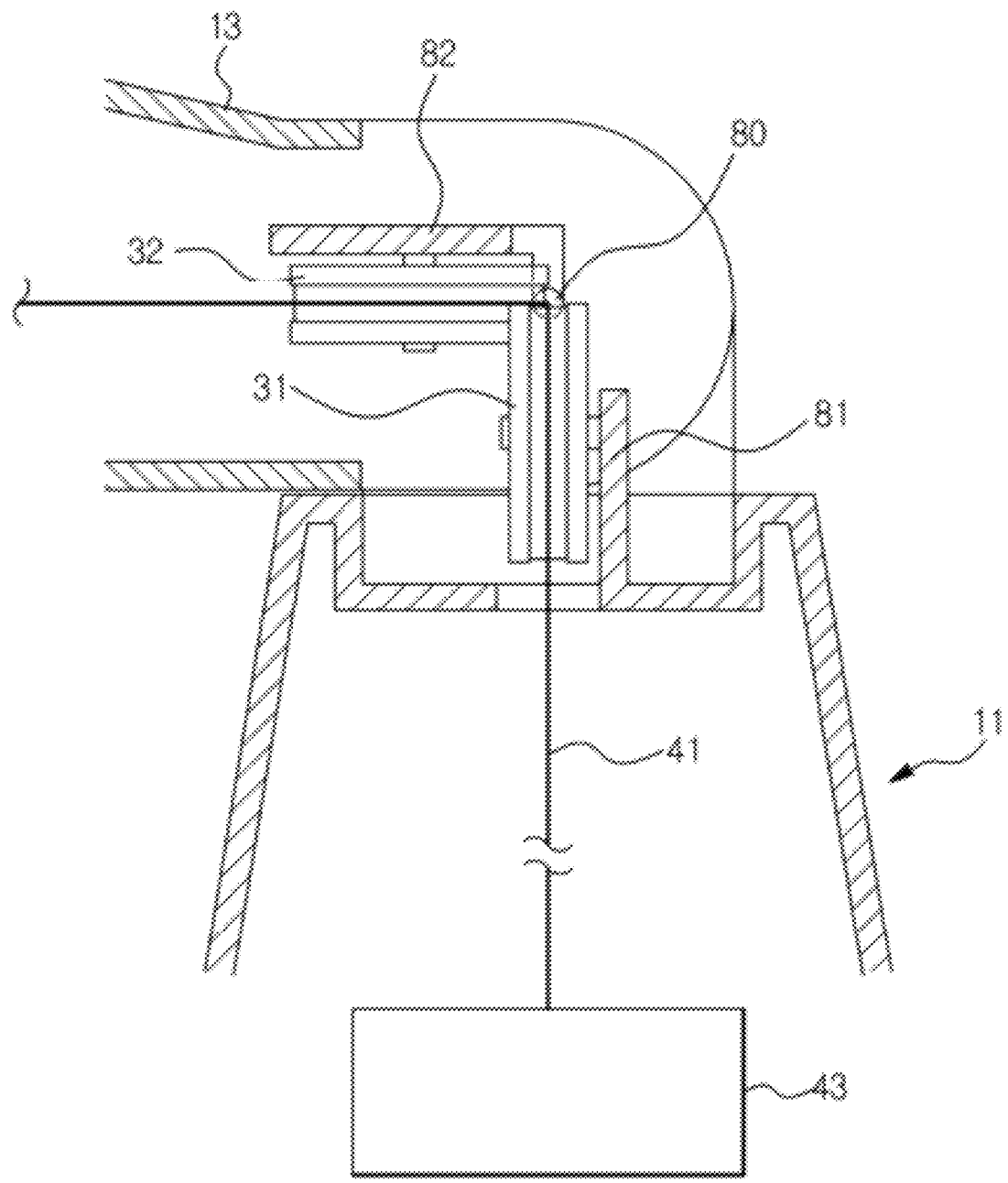
FIG. 15 is a side sectional view showing a hand body, which is bent to the left relative to a robot arm, according to the present general inventive concept.

FIG. 14 is a side sectional view showing the hand body, which is bent to the right relative to the robot arm, according to this embodiment, and FIG. 15 is a side sectional view showing the hand body, which is bent to the left relative to the robot arm, according to this embodiment.

FIG. 13 shows the hand body 13 before the hand body 13 is bent relative to the robot arm 11, and FIG. 14 shows the hand body 13 that is bent to the right relative to the robot arm 11 at an angle of 90 degrees. In addition, FIG. 15 shows the hand body 13 that is bent to the left relative to the robot arm 11 at an angle of 90 degrees. As shown in FIGS. 13 to 15, the first connection member 41 is provided on the same line with the pivot shaft 80, so that the length of the first connection member 41 between the first and second guide members 31 and 32 can be constantly maintained even if the hand body 13 is bent relative to the robot arm 11.

Although few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. A humanoid robot comprising:
   a wrist joint connecting a robot arm to a hand body;
   a first actuator and a first power transmission device that drive the wrist joint to rotate the hand body relative to the robot arm;
   finger members comprising finger joints and knuckles, wherein the finger members are connected to the hand body; and
   a second actuator and a second power transmission device that drive the finger joints to rotate the finger members relative to the hand body,
   wherein the second power transmission device includes a connection member connecting the finger joints to the second actuator, and a guide member for guiding the connection member,
   wherein the guide member includes a first guide member coupled with the robot arm and a second guide member coupled with the hand body,
   wherein the connection member is alternately wound around the first and second guide members,
   wherein the robot arm comprises a first contact section making contact with the hand body, the hand body comprises a second contact section making contact with the first contact section, wherein the second contact section is configured to roll on the first contact section, and
   wherein the first contact section has a planar shape, and the second contact section has a circular shape having a radius about a rotating section.

2. The humanoid robot as claimed in claim 1, wherein lengths of connection members provided between the first and second guide members are constantly maintained even if the second guide member is shifted from the first guide member.

3. The humanoid robot as claimed in claim 2, wherein the hand body includes a pivot shaft rotatably coupled to the robot arm.

4. The humanoid robot as claimed in claim 3, wherein the first power transmission device includes the pivot shaft and a belt for rotating the pivot shaft.

5. The humanoid robot as claimed in claim 4, wherein a first reel is fitted around the pivot shaft and a second reel is coupled with the first actuator.

6. The humanoid robot as claimed in claim 3, wherein the robot arm includes a first support member, to which the first guide member is rotatably coupled, and the hand body includes a second support member, to which the second guide member is rotatably coupled.

7. The humanoid robot as claimed in claim 6, wherein the second support member rotates together with the pivot shaft.

8. The humanoid robot as claimed in claim 3, wherein portions of connection members aligned between the first and second guide members are positioned in line with the pivot shaft rotatably coupled to the robot arm.

9. The humanoid robot as claimed in claim 1, wherein the first power transmission device includes a support member connecting the robot arm to the hand body and a belt for rotating the support member.

10. The humanoid robot as claimed in claim 9, wherein the support member includes a first rotating section rotatably installed in the robot arm and a second rotating section rotatably installed in the hand body.

11. The humanoid robot as claimed in claim 10, wherein the first guide member is rotatably coupled with the first rotating section and the second guide member is rotatably coupled with the second rotating section.

12. The humanoid robot as claimed in claim 1, wherein a radius of the second guide member is identical to the radius of the second contact section.

13. The humanoid robot as claimed in claim 1, wherein the first power transmission device includes a first rotating section rotatably inserted into the hand body and a belt for moving the first rotating section.

14. The humanoid robot as claimed in claim 13, further comprising a slot for guiding the first rotating section and a belt support member having a reel that supports the belt to allow the belt to guide the first rotating section along the slot.

15. A humanoid robot comprising:
a robot arm having a first contact section;
a hand body having a second contact section to make rolling-contact with the first contact section of the robot arm through a wrist joint;
finger members comprising finger joints and knuckles, wherein the finger members are connected to the hand body;
a first actuator and a first power transmission device that drive the wrist joint to rotate the hand body relative to the robot arm;
a second actuator and a second power transmission device that drive the finger joints to rotate the finger members relative to the hand body,
wherein the first power transmission device driving the wrist joint operates independently from the second power transmission device driving the finger joints, and
wherein the first contact section has a planar shape, and the second contact section has a circular shape having a radius about a rotating section.

16. The humanoid robot as claimed in claim 15, wherein the second power transmission device include connection members connecting the second actuator to the finger joints and guide members for guiding the connection members, and friction between the connection members and the guide members is constantly maintained when the wrist joint is driven by the first actuator and the first power transmission device.

17. The humanoid robot as claimed in claim 16, wherein the guide members include a first guide member coupled to the robot arm and a second guide member coupled to the hand body, and the connection members are alternately wound around the first and second guide members.

18. The humanoid robot as claimed in claim 17, wherein lengths of the connection members provided between the first and second guide members are constantly maintained even if the second guide member is shifted from the first guide member.

19. The humanoid robot as claimed in claim 18, wherein the connection members include wires and the guide members include pulleys.

20. The humanoid robot of claim 15, wherein the first contact section rolls on the second contact section while a contact point between the first and second contact sections is shifted.

21. A humanoid robot comprising:
a robot arm having a first contact section;
a hand body having a second contact section making rolling-contact with the first contact section of the robot arm through a wrist joint, the hand body connected to the robot arm through the wrist joint;
finger members comprising finger joints and knuckles, wherein the finger members are connected to the hand body;
a first actuator and a first power transmission device that drive the wrist joint to rotate the hand body relative to the robot arm; and
a second actuator and a second power transmission device that drive the finger joints to rotate the finger members relative to the hand body, wherein
the second power transmission device including connection members to connect the second actuator to the finger joints and first and second guide members to guide the connection members, such that the length of the connection members is constantly maintained,
wherein the first contact section has a circular shape having a first radius, and a second contact section has a circular shape having a second radius, and
wherein a ratio of the first radius to the second radius is the same as the ratio of the radius of the first guide member to the radius of the second guide member when the first radius is different from the second radius.

22. The humanoid robot as claimed in claim 21, comprising:
a support member that connects the hand body to the robot arm, wherein the support member comprises:
a first rotating section inserted into the robot arm;
a second rotating section inserted into the hand body; and
a leg section connecting the first rotating section to the second rotation section.

23. The humanoid robot as claimed in claim 22, comprising:
a first reel installed at the support member;
a second reel installed adjacent the first actuator; and
a belt that is wound around the first and second reels, wherein a driving force of the first actuator is transferred to the support member through the belt.

24. The humanoid robot of claim 21, wherein making rolling-contact includes rolling the first contact section on the second contact section while a contact point between the first and second contact sections is shifted.

* * * * *